May 29, 1934.   H. E. DOERR   1,960,300
WHEEL
Filed May 13, 1932   3 Sheets-Sheet 1
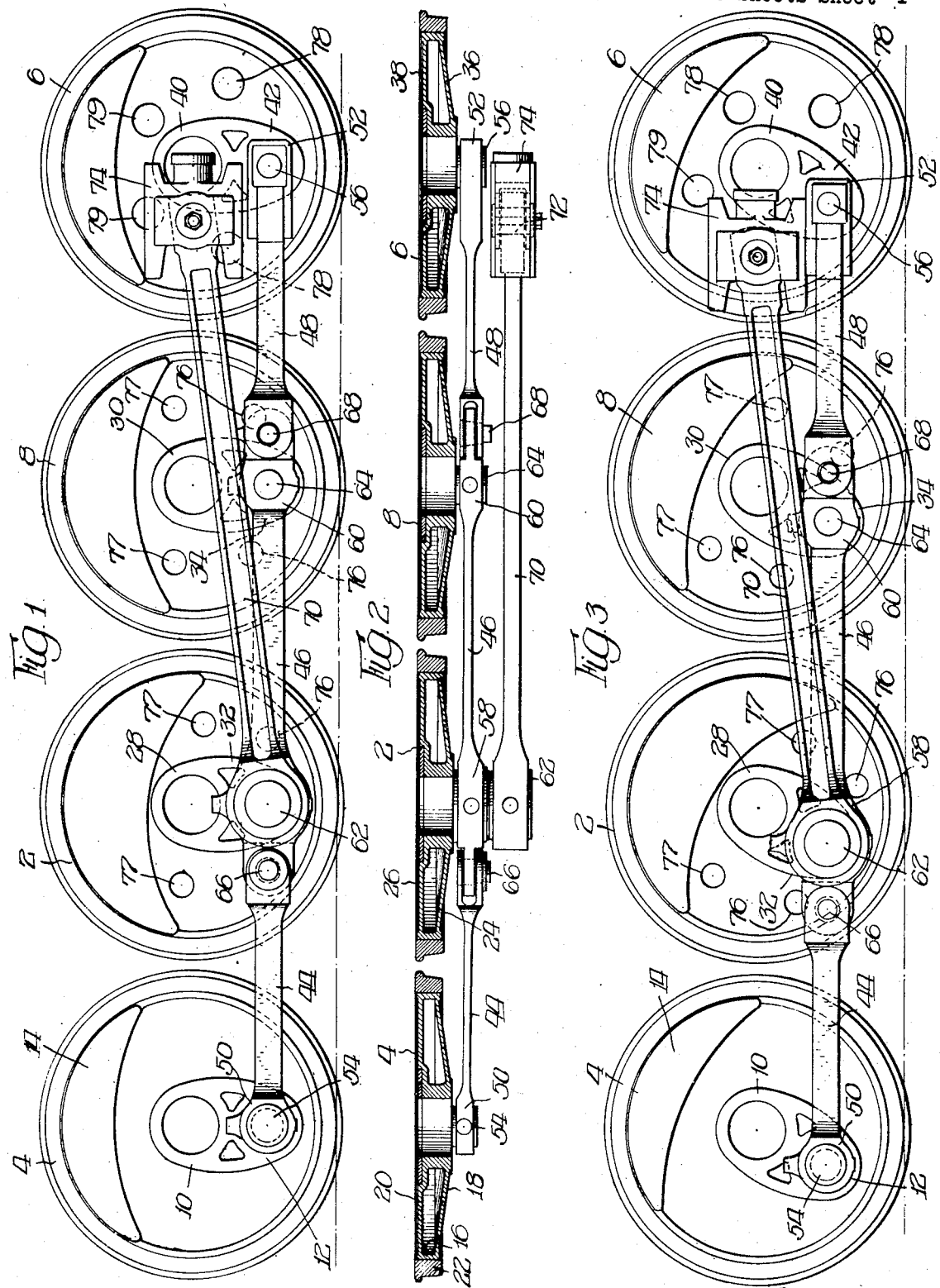
Inventor:
Harry E. Doerr,
By Wilkinson, Huxley, Byron & Knight
Attys May 29, 1934.  H. E. DOERR  1,960,300
WHEEL
Filed May 13, 1932    3 Sheets-Sheet 2
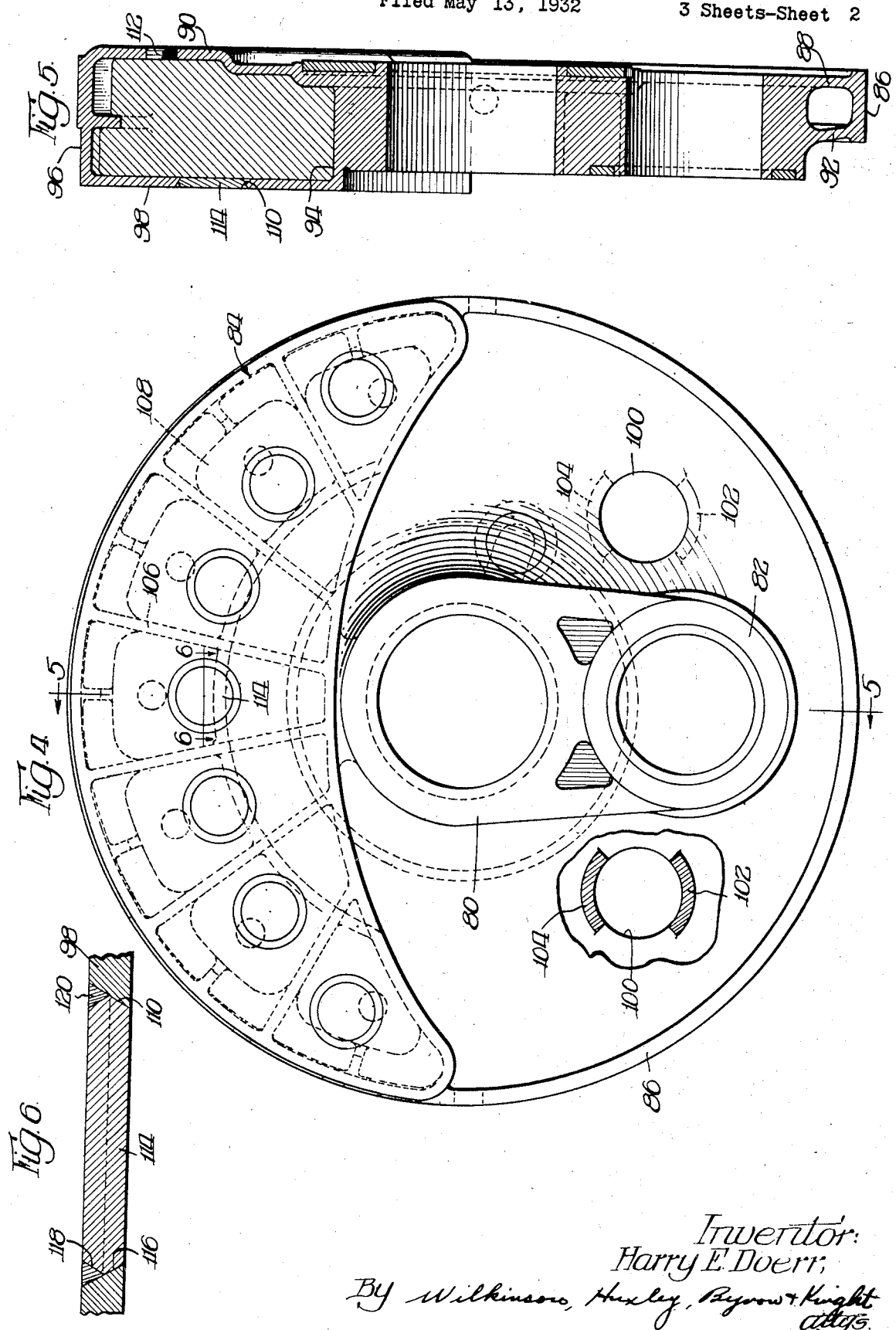
Inventor:
Harry E. Doerr,
By Wilkinson, Huxley, Byron + Knight
attys.

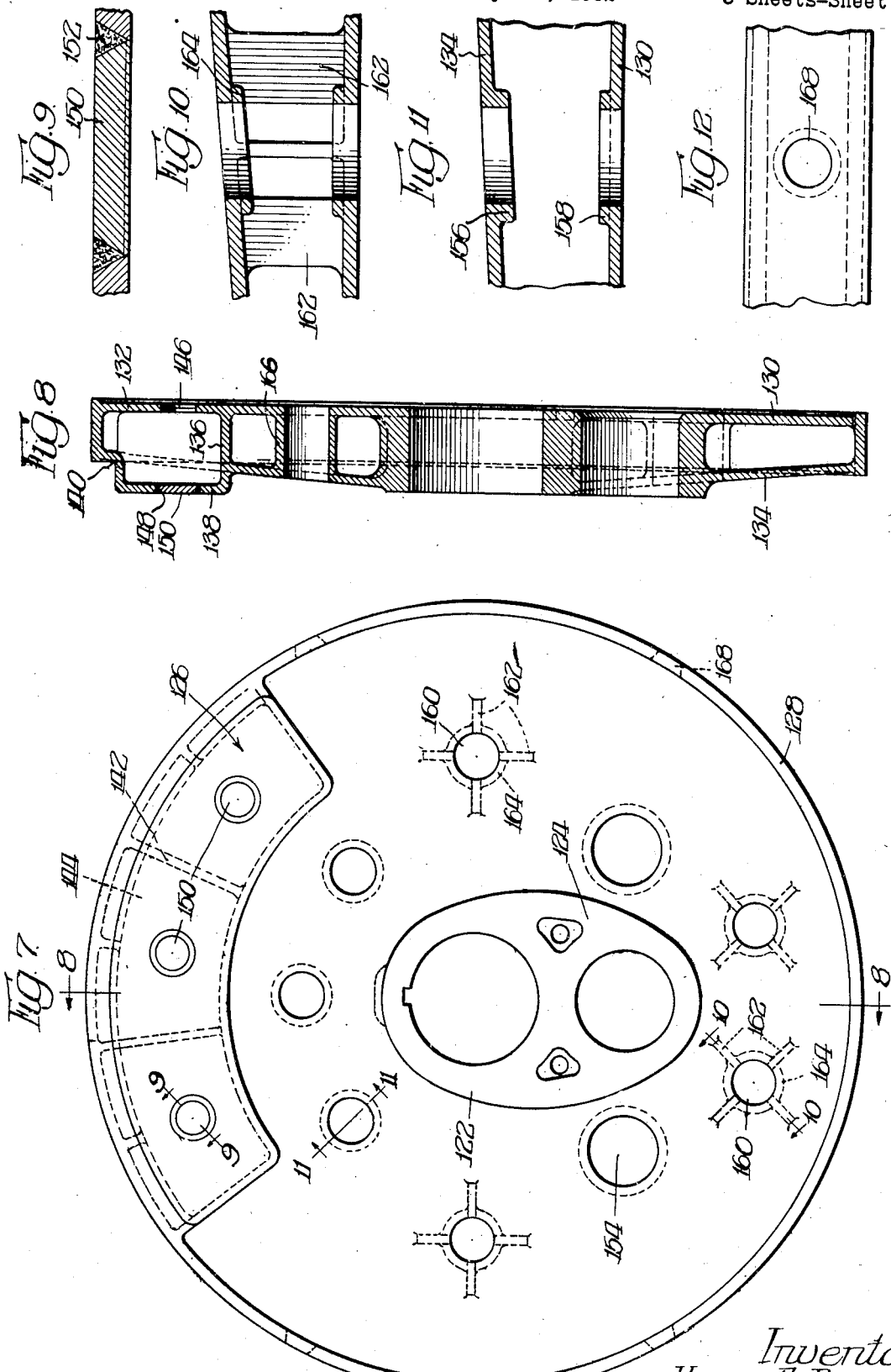

Patented May 29, 1934

1,960,300

UNITED STATES PATENT OFFICE 1,960,300

WHEEL

Harry E. Doerr, St. Louis, Mo.

Application May 13, 1932, Serial No. 611,088

34 Claims. (Cl. 295—2)

The present invention relates to wheels, and more in particular to driving wheels for locomotives or the like.

In locomotives at the present time the driving wheels therefor are formed with a plurality of spokes radiating outwardly from the main hub to the counter-balance portion, and from the main and crank pin hubs to the rim portion thereof. In this well-known assembly, there is ample space provided for the removal of various elements such as the pins connecting the side rods together, as well as for removing the pin connecting the connecting rod to the cross-head. This general assembly of driving wheels incorporating spokes is being replaced by an assembly of driving wheels including spaced discs or webs extending between the main hub and counter-balance, as likewise between the main and crank pin hub and rim portion thereof. Because of the continuous formation of these webs and because of their close proximity to the driving elements for these wheels, as for example the side rods and connecting rod, suitable means must be provided whereby the connecting elements such as the knuckle pins for these side rods, as well as the cross-head pin connecting the connecting rod to the cross-head, may be conveniently and readily removed when it is desired to repair these rods or make replacements, without necessitating a complete dismantling of the driving members for the locomotive.

It is therefore an object of the present invention to provide a novel locomotive drive wheel construction incorporating webs or discs which are formed with one or more openings which, when the wheel is in its assembled position upon the locomotive, is adapted to be moved into a position oppositely disposed in relation to a knuckle or cross-head pin, whereby the pin may be conveniently removed without dismantling the entire driving assembly of the locomotive.

More particularly, the present invention contemplates the idea of providing one or more openings in the spaced discs or webs for these locomotive drive wheels which are in alignment and which may be moved into a position whereby a knuckle pin or cross-head pin can be easily and readily backed through these openings, and the side rods or connecting rod, respectively, may be replaced or repaired as desired.

The present invention also includes as an object the idea of providing a novel locomotive drive wheel incorporating the spaced web construction in which these openings may or may not be provided, and wherein a counter-balance pocket is formed with a wall having an opening for removing core forming material, and which is normally closed to provide a finished wheel construction, as by means of a closure plate secured as by welding to this wall of the counter-balance pocket.

Still another object of the present invention is to provide a novel locomotive drive wheel having a counter-balance pocket divided into a plurality of chambers or compartments as by means of spaced webs extending between opposite walls of the pocket and serving to reinforce the same, the core forming material being removed from these chambers or compartments through openings provided in one of the walls thereof which may be closed by a plate secured to the wall as by means of welding or the like.

The present invention further comprehends the idea of providing a novel locomotive drive wheel formed with spaced webs having aligned openings for removal of a knuckle or cross-head pin which is incorporated or included as an element in the driving means therefor, the webs of the locomotive drive wheel being reinforced as by means of spaced walls extending between these webs, the space between these webs serving to provide an opening for removal of core forming material between the webs through the aligned openings. The present invention also includes the idea of reinforcing these aligned openings as by means of beaded portions which may extend inwardly and around the openings.

Another object within the purview of the present invention is to provide a novel wheel for a car or the like, including spaced webs formed with openings for removal of core forming material from the space between the same, these spaced webs being reinforced as by means of spaced members. More particularly, an embodiment selected to illustrate the present invention comprises these spaced webs having aligned openings which are reinforced as by means of these spaced members extending between the webs and radiating outwardly from the openings, these openings being further reinforced as by means of inwardly disposed beaded portions formed integral with the webs.

Still another object of the present invention is to provide a wheel for a locomotive or the like which may be provided with spaced webs having openings for removal of the pins, as likewise core forming material as hereinbefore set out, and which may be reinforced as by means of spaced members, beaded portions, or both, and in which a certain portion of these spaced webs may be reinforced as by means of continuous wall portions formed integral with the webs and extending therebetween and having an opening coinciding with openings provided in these spaced webs or discs.

The present invention also includes the idea of providing a novel wheel for a locomotive or the like formed in the manner as disclosed in the preceding paragraph, and also incorporating a counter-balance pocket of a construction as hereinbefore set out.

Other objects, features, capabilities and advantages are comprehended by the invention, as will later appear and as are inherently possessed thereby.

Referring to the drawings:

Figure 1 is a view in side elevation of a driving wheel assembly for a locomotive, the wheels thereof being constructed in accordance with the present invention;

Figure 2 is a view in horizontal cross section of the assembly as shown in Figure 1 of the drawings;

Figure 3 is a view in side elevation of the assembly shown in Figure 1 of the drawings with the wheels advanced to provide for the removal of certain elements of the driving means;

Figure 4 is a view in elevation of another embodiment made in accordance with the present invention;

Figure 5 is a view in cross section taken in a plane represented by line 5—5 of Figure 4 of the drawings;

Figure 6 is a fragmentary view in cross section of one of the apertured walls of the counter-balance pocket shown in Figure 4 of the drawings, the same being closed in accordance with the present invention;

Figure 7 is a view in elevation of still another embodiment made in accordance with the present invention;

Figure 8 is a view in cross section taken in a plane represented by line 8—8 of Figure 7 of the drawings;

Figures 9, 10 and 11 are fragmentary views in cross section taken in the planes represented by lines 9—9, 10—10 and 11—11, respectively, of Figure 7 of the drawings; and Figure 12 is a fragmentary view in elevation of a portion of the rim of the embodiment shown in Figure 7 of the drawings.

Referring now more in detail to the drawings, and more in particular to Figures 1 to 3 inclusive, a locomotive drive wheel assembly incorporating or including wheels made in accordance with the present invention is disclosed as comprising a main driving wheel 2, back and front wheels 4 and 6, respectively, and an intermediate driving wheel 8. In these figures, this series of wheels is disclosed as representing an assembly for one side of a locomotive, and it is of course understood that the same are suitably mounted upon one end of axles, and upon the other end of which is mounted a similar series of driving wheels.

It will be noted that the back wheel 4 is formed with a main hub 10, a crank pin hub 12, a counter-balance portion 14 and a rim portion 16. Extending between the main hub and counter-balance portion 14 and between the main and crank pin hubs and rim portion are spaced substantially continuous or imperforate discs or webs 18 and 20, these webs or discs being formed integral with the hubs and counter-balance and rim portions. Shrunk or otherwise secured upon the rim portion 16 of this drive wheel is a flanged tread portion 22 which provides a finished wheel construction. It will be observed that in the present embodiment of this back wheel, the same comprises a wheel center, upon which the flanged tread 22 is shrunk or otherwise secured, although the present invention comprehends the idea of forming this flanged tread 22 as an integral part of the rim 16, and in the present specification and claims the term "wheel" is intended to include either of these two constructions.

The main wheel 2 and intermediate wheel 8 are of somewhat similar construction, each of the same including the spaced webs or discs 24 and 26 and the main and intermediate wheels having the main hubs 28 and 30, respectively, and the crank pin hubs 32 and 34, respectively. The front wheel as shown in the assembly, likewise is of a construction similar to the wheels 2 and 8, and includes the spaced webs or discs 36 and 38, as well as the main and crank pin hubs 40 and 42. This series of drive wheels is connected together as by means of the side rods 44, 46 and 48, the side rods 44 and 48 having the end hub portions 50 and 52 fitting over the crank pins 54 and 56, respectively, while the side rod 46 is formed with the hubs 58 and 60 movably connected to the crank pins 62 and 64 for the wheels 2 and 8, respectively. The side rods 44 and 46 are connected together as by means of a knuckle pin 66, while the side rods 46 and 48 are connected as by means of a knuckle pin 68. Mounted upon the outer end of the crank pin 62 is a connecting rod 70 which is connected as by means of a cross-head pin 72 to a cross-head 74 which is adapted to be driven as is well-known in the art for driving the main drive wheel 2, the other wheels of the series being driven through the medium of the side rods, as disclosed.

Heretofore, locomotive drive wheels in an assembly as disclosed herein have been formed with spokes suitably spaced apart so that sufficient space has been provided whereby various elements of the driving means therefor, as for example, the knuckle pins 66 and 68, as well as the cross-head pin 72, could be removed by backing the same through the adjacent wheels when it was desired to remove any one or more of these side rods or connecting rod or to repair any part thereof. In the present type of locomotive drive wheel incorporating the continuous web or discs, these elements cannot be removed, and it has been found necessary to dismantle the entire assembly even though it was desired to repair a small part thereof. In view of the enormous expense involved in such a dismantling of these driving elements, it has been found that the discs may be formed with openings suitably located so as to be moved into a position whereby these pins may be backed out and through the same. In the present embodiment, the webs 24 and 26 of the driving wheels 2 and 8 have been provided with one or more openings such as the openings 76 which are disposed in alignment and so placed in respect to the axis of rotation of these wheels that the same may be moved into oppositely disposed relation with the knuckle pins 66 and 68 when it is desired to remove either one of these knuckle pins. Furthermore, the discs or webs 36 and 38 of the front wheel 6 are formed with one or more aligned openings such as 78, which are also disposed or positioned in relation to the axis of rotation as to be moved into opposite alignment with the cross-head pin 72, whereby this pin may likewise be backed or pushed therethrough when it is desired to disconnect the connecting rod 70 from the assembly. Inasmuch as there is no knuckle pin or some other element associated with the back wheel 4, this wheel may be conveniently formed with continuous discs 18 and 20, as disclosed. The discs or webs of the wheels 2 and 6, and 8 may be further provided with aligned openings such as the openings 77 and 79 for removal of core forming material from between the webs and the webs adjacent thereto may be reinforced or tied together as hereinafter more fully disclosed.

It will be quite apparent from the above disclosure that the openings provided in the discs of the driving wheels shown in the present assembly comprise or constitute a convenient way in which to remove certain elements of the driving means for the assembly without necessitating a complete dismantling of the entire series of drive wheels, together with the associated driving mechanism.

In Figures 4 to 6 inclusive is disclosed another driving wheel for a locomotive or the like, made in accordance with the present invention, the same comprising a main hub 80, a crank pin hub 82, a counter-balance pocket 84, and a rim portion 86. Extending between the hubs 80 and 82 and the rim portion 86 is a web or disc 88 having a portion 90 forming one of the walls of the counter-balance pocket 84. Spaced in relation to the web or disc 88 and extending between the main hub 80 and counter-balance pocket 84, as well as between the hubs 80 and 82 and the rim portion 86 is a second web or disc 92 which terminates in a transverse wall 94 of the counter-balance pocket 84. The counter-balance pocket 84 is further formed with an oppositely disposed wall 96 formed integral with the rim 80 and has a wall 98 spaced in opposite relation to the wall 90.

In the present embodiment, the spaced webs 88 and 92 may be formed with oppositely disposed openings 100 to provide suitable space whereby a knuckle or cross-head pin may be backed therethrough when it is desired to remove one or more elements of the driving means associated therewith. The openings 100 also serve to provide means whereby the core forming material between the spaced webs may be removed, and the discs or webs may be suitably reinforced adjacent these openings as by means of the spaced walls 102 and 104 extending between the webs, these walls being disposed in spaced relation to provide an opening for passage of this core forming material.

In order to reinforce the oppositely disposed walls 90 and 98 of the counter-balance pocket 80, a plurality of webs such as 106 may be provided, these webs extending between these walls and being radially disposed between the walls 94 and 96 to form a plurality of compartments, such as the compartment or chamber 108. The core forming material within these chambers or compartments 108 may be removed therefrom through openings 110 provided in the front wall 98 of the wheel, and lead or other counter-balance material may be introduced into these compartments through openings 112 provided in the rear wall 90 of this counter-balance pocket. It is of course understood that either or both of these openings 110 or 112 may be used for removal of core forming and counter-balance materials. The openings 110 in the front walls 98 may be closed as by means of closure plates 114 which are formed with a bevelled portion 116 conforming to the bevelled edge of this opening 110. This closure plate 114 may be further formed with a bevelled edge 118 to provide an annular V-shaped groove with the wall 98 adapted to receive suitable welding material 120. After this welding material 120 has been placed as shown, the front surface of the locomotive wheel may be machined in any desired manner to provide a finished construction in which the closure plates 114 are flush with the front surface of the wall 98. In order to provide a finished wheel construction after this core forming material has been removed and the openings 110 closed, these chambers may be filled with some suitable counter-balance material such as lead or the like, and the openings 112 closed as by means of a plug (not disclosed) threaded in this wall.

In Figures 7 and 8 is disclosed still a further embodiment of the present invention, the same comprising a main hub 122, a crank pin hub 124, a counter-balance pocket 126 and a rim portion 128. As in the previously described embodiment, the web or disc 130 extends between the main and crank pin hubs 122 and 124 and the rim portion 128, the portion 132 forming the rear wall of the counter-balance pocket 126. Disposed in spaced relation to the web or disc 130 and extending between the hubs 122 and counter-balance pocket 126 and between the hubs 122 and 124 and the rim portion 128, is a web or disc 134 having a part intersecting a transversely disposed wall 136 of the counter-balance pocket 126, and which extends between the disc 130 and the front wall 138 of this counter-balance pocket, this front wall 138 having an inwardly disposed wall portion 140 terminating in the rim portion 128 adjacent thereto.

As in the hereinbefore described embodiment, this counter-balance pocket 126 may be formed with radially disposed webs 142 forming a plurality of compartments or chambers 144 adapted to be filled with any suitable counter-balancing material, such as lead or the like. The chambers of this counter-balance pocket are closed as by means of plugs (not disclosed) threaded in the openings 146 formed in the back wall 132 thereof, while the openings 148 provided in the front wall 138 may be closed as by means of closure plates 150 secured to this wall by the welded joint 152.

The webs 130 and 134 may also be formed with aligned openings, such as the opening 154, for receiving a knuckle or cross-head pin in a manner as hereinbefore described, these holes being reinforced in the present embodiment as by means of the annular beaded portions 156 and 158 formed integral with the webs 130 and 134, respectively.

The webs 130 and 134 are further provided with one or more aligned openings 160, whereby the core forming material therebetween may be easily and conveniently removed. These webs are reinforced adjacent these openings 160 as by means of web members 162 extending therebetween and radiating outwardly from the center of the openings, the openings being reinforced as by means of an annular beaded portion 164 formed integral therewith and defining these openings 160. The webs 130 and 134 in the present embodiment are further reinforced intermediate the main hub 122 and the counter-balance pocket 126 as by means of continuous walls 166 extending therebetween and having an opening coinciding with aligned openings formed in these webs, these wall portions 166 being formed integral with the web or disc members.

The rim portion 128 may be formed with one or more holes or openings 168 for removal of core rods, as well as core forming material, these openings being welded or otherwise made solid before a rim is shrunk or otherwise secured upon the rim portion to provide a finished wheel construction.

While I have herein described and upon the drawings shown illustrative embodiments of the invention, it is to be understood that the invention is not limited thereto but may comprehend other constructions, arrangements of parts, details and features without departing from the spirit of the invention.

I claim:

1. In a locomotive or the like, the combination of a series of wheels, each of said wheels being formed with a rim portion, a main and crank pin hub, a substantially imperforate web extending between said hubs and rim, a crank pin in said crank pin hub and a plurality of side rods connected to said crank pins and extending between said wheels, knuckle pins connecting said side rods together, certain of said wheels having the webs thereof provided with an opening adapted to be moved into alignment with an adjacent knuckle pin whereby said knuckle pin may be removed therethrough.

2. In a locomotive or the like, the combination of a series of wheels, each of said wheels being formed with a rim portion, a counter-balance portion, a main and crank pin hub portion, spaced substantially imperforate webs extending between said main hub and counter-balance portions and between said hub portions and rim portions, a crank pin in said crank pin hub, and a plurality of side rods connected to said crank pins and extending between adjacent wheels, knuckle pins connecting said side rods together, certain of said wheels having the webs thereof provided with aligned openings adapted to be moved into opposite relation to said knuckle pins whereby the same may be removed therethrough.

3. In a locomotive or the like, the combination of a series of wheels, each of said wheels being formed with a rim portion, a counter-balance portion, a main and crank pin hub portion, spaced substantially imperforate webs extending between said main hub and counter-balance portions and between said hub portions and rim portions, a crank pin in said crank pin hub, a plurality of side rods connected to said crank pins and extending between adjacent wheels, knuckle pins connecting said side rods together, and a connecting rod connected to one of said crank pins and secured at its other end to a cross-head opposite one of said wheels, a cross-head pin for connecting said rod to said cross-head, certain of said wheels having the webs thereof provided with aligned openings adapted to be moved into opposite relation to said knuckle pins whereby the same may be removed therethrough, said wheel opposite said cross-head having the webs thereof provided with aligned openings adapted to be moved into opposite relation to said cross-head pin whereby the same may be removed therethrough.

4. A wheel for a locomotive or the like, comprising a rim portion, a main and crank pin hub each having an opening therethrough, a substantially imperforate web extending between said hubs and rim portion and having an opening therethrough in spaced relation to said first-named openings so positioned to be movable into opposite relation to a pin associated with driving means for said wheel for removal of the same therethrough.

5. A wheel for a locomotive or the like, comprising a rim portion, a counter-balance portion, a main and crank pin hub, each having an opening therethrough, and spaced substantially imperforate webs extending between said main hub and counter-balance portion and between said hubs and rim portion, said webs having openings in alignment in spaced relation to said first-named openings and so positioned to be movable into opposite relation to a pin associated with driving means for said wheel for removal of the same therethrough.

6. In a locomotive or the like, the combination of a wheel, driving means therefor and including a knuckle pin, said wheel comprising a rim portion, a counter-balance portion, a main and crank pin hub, and a substantially imperforate web extending between said main hub and counter-balance portion and hubs and rim portion, said web having an opening so positioned to be movable into opposite relation to said knuckle pin for removal of the same therethrough.

7. In a locomotive or the like, the combination of a wheel, driving means therefor and including a knuckle pin, said wheel comprising a rim portion, a counter-balance portion, and spaced substantially imperforate webs extending between said main hub and counter-balance portion and hubs and rim portion, said webs having aligned openings so positioned to be movable into opposite relation to said knuckle pin for removal of the same therethrough.

8. In a locomotive or the like, the combination of a wheel, driving means therefor and including a cross-head pin, said wheel comprising a rim portion, a counter-balance portion, a main and crank pin hub, and a substantially imperforate web extending between said main hub and counter-balance portion and between said hubs and rim portion, said web having an opening so positioned to be movable into opposite relation to said cross-head pin for removal of the same therethrough.

9. In a locomotive or the like, the combination of a wheel, driving means therefor and including a cross-head pin, said wheel comprising a rim portion, a counter-balance portion, a main and crank pin hub, and spaced substantially imperforate webs extending between said main hub and counter-balance portion and between said hubs and rim portion, said webs having aligned openings so positioned to be movable into opposite relation to said cross-head pin for removal of the same therethrough.

10. A car wheel comprising a rim portion, a hub portion, spaced webs extending between said portions and having aligned openings, and spaced members extending between said webs adjacent said openings for reinforcing the same and to provide an opening communicating with the openings of said webs for removal of core forming material from between said webs.

11. A wheel for a locomotive or the like, comprising a rim portion, a main and crank pin hub, a counter-balance portion, spaced webs extending between said main hub and counter-balance portion and between said hubs and rim portion, said webs having aligned openings suitably positioned for removal of driving elements associated with said wheel, and members extending between said webs adjacent said openings for reinforcing the same, said members being provided in spaced relation to provide a passage from between said webs through said opening for removal of core forming material.

12. A car wheel comprising a rim portion, a hub portion, spaced webs extending between said portions, said webs being formed with aligned openings for removal of core forming material from between said webs, and members extending between said webs adjacent said openings for reinforcing the same, said members extending laterally away from said openings.

13. A car wheel comprising a rim portion, a hub portion, spaced webs extending between said portions, said webs being formed with aligned openings for removal of core forming material from between said webs, and members extending between said webs adjacent said openings for reinforcing the same, said members being in spaced relation and extending radially away from the openings.

14. A wheel for a locomotive or the like, comprising a rim portion, a main and crank pin hub, a counter-balance portion, spaced webs extending between said main hub and counter-balance portion and between said hubs and rim portion, said webs having a plurality of aligned openings, certain of said openings being suitably positioned for removal of driving elements associated with said wheel, certain other of said openings being provided for removal of core forming material from between said webs, and reinforcing members extending between said webs adjacent said last-named openings.

15. A wheel for a locomotive or the like, comprising a rim portion, a main and crank pin hub, a counter-balance portion, spaced webs extending between said main hub and counter-balance portion and between said hubs and rim portion, said webs having a plurality of aligned openings, certain of said openings being suitably positioned for removal of driving elements associated with said wheel, said webs being reinforced by a beaded portion around said openings, certain other of said openings being provided for removal of core forming material from between said webs, and reinforcing members extending between said webs adjacent said last-named openings.

16. A wheel for a locomotive or the like, comprising a rim portion, a main and crank pin hub, a counter-balance portion, spaced webs extending between said main hub and counter-balance portion and between said hubs and rim portion, said webs having a plurality of aligned openings, certain of said openings being suitably positioned for removal of driving elements associated with said wheel, said webs being reinforced by a beaded portion around said openings, certain other of said openings being provided for removal of core forming material from between said webs, and reinforcing members between said webs and extending radially away from said openings, said members being disposed in spaced relation to provide for the removal of said core forming material from between said webs through said openings.

17. In a wheel for a locomotive or the like, the combination of a counter-balance pocket having a wall formed with an opening for removal of core forming material from said pocket, said wall defining said opening being bevelled, a closure plate having a bevelled portion adapted to conform to the bevel of said wall and having a bevelled portion providing a weld joint with the bevel of said wall, and welding material in said joint for securing said plate to said wall.

18. A car wheel comprising a rim portion, a hub portion, spaced webs extending between said portions and having aligned openings, and a reinforcing member extending between said webs adjacent said openings, said member having a width less than the periphery of said openings whereby access may be gained for removal of core forming material from between said webs.

19. A wheel for a locomotive or the like, comprising a rim portion, a main and crank pin hub, a counter-balance portion, spaced webs extending between said main hub and counter-balance portion and between said hubs and rim portion, said webs having aligned openings suitably positioned for removal of a driving element associated with said wheel, and a reinforcing member extending between said webs adjacent each of said openings, said member having a width less than the periphery of said opening whereby access may be gained for removal of core forming material from between said webs.

20. A wheel for a locomotive or the like, comprising a rim portion, a main and crank pin hub, a counter-balance portion, spaced webs extending between said main hub and counter-balance portion and between said hubs and rim portion, said webs having aligned openings suitably positioned for removal of a driving element associated with said wheel, said webs having other aligned openings for removal of core forming material from between said webs, and a plurality of reinforcing members between said webs and extending away from said openings.

21. A wheel for a locomotive or the like, comprising a rim portion, a main and crank pin hub, a counter-balance portion, spaced webs extending between said main hub and counter-balance portion and between said hubs and rim portion, said webs having aligned openings suitably positioned for removal of a driving element associated with said wheel, said webs having other aligned openings for removal of core forming material from between said webs, and a plurality of reinforcing members between said webs in spaced relation and extending radially away from the openings.

22. A wheel for a locomotive or the like, comprising a rim portion, a main and crank pin hub each having an opening therethrough, a counter-balance portion, and a plurality of substantially imperforate webs extending between said main hub and counter-balance portion and between said hubs and rim portion, said webs having openings in alignment in spaced relation to said first-named openings and so positioned to be movable into opposite relation to a pin associated with driving means for said wheel for removal of the same therethrough.

23. In a locomotive or the like, the combination of a wheel, driving means therefor including a pin, said wheel comprising a rim portion, a main and crank pin hub each having an opening therethrough, a counter-balance portion, and a plurality of substantially imperforate webs extending between said main hub and counter-balance portion and between said hubs and rim portion, said webs having openings in alignment in spaced relation to said first-named openings and so positioned to be movable into opposite relation to said pin for removal of the same therethrough.

24. In a wheel for a locomotive or the like, the combination of a counter-balance pocket having a wall formed with an opening, said wall defining said opening being bevelled, a closure member fitting within said opening, and welding material between said closure member and said bevelled portion of the wall.

25. In a wheel for a locomotive or the like, the combination of a counter-balance pocket having a wall formed with an opening, said wall defining said opening being bevelled, a closure member for said opening and having a bevelled portion providing a weld joint with the bevel of said wall, and welding material in said joint for securing said plate to said wall.

26. A wheel comprising a rim portion, a hub portion, and spaced substantially imperforate webs between said portions, said webs having aligned openings therethrough and so positioned as to be movable into opposite relation to a pin associated with driving means for said wheel for removal of the same therethrough, one of said webs having an opening for removal of core forming material from the space between said webs.

27. A wheel comprising a rim portion, a hub portion, and spaced substantially imperforate webs between said portions, said webs having aligned openings therethrough and so positioned as to be movable into opposite relation to a pin associated with driving means for said wheel for removal of the same therethrough, said webs having spaced openings disposed for removal of core forming material from the space between said webs.

28. A wheel for a locomotive or the like, comprising a rim portion, a counter-balance portion, a main and crank pin hub, and spaced substantially imperforate webs between said main hub and counter-balance portion and between said hubs and rim portion, said webs having aligned openings therethrough and so positioned as to be movable into opposite relation to a pin associated with driving means for said wheel for removal of the same therethrough, one of said webs having an opening for removal of core forming material from the space between said webs.

29. A wheel for a locomotive or the like, comprising a rim portion, a counter-balance portion, a main and crank pin hub, and spaced substantially imperforate webs between said main hub and counter-balance portion and between said hubs and rim portion, said webs having aligned openings therethrough and so positioned as to be movable into opposite relation to a pin associated with driving means for said wheel for removal of the same therethrough, said webs having spaced openings disposed for removal of core forming material from the space between said webs.

30. The combination of a series of wheels, one of said wheels comprising a driving crank and a substantially imperforate web disposed adjacent thereto, and drive means connected to said crank and including adjacent members pivotally connected by a pin, said web being provided with an opening so positioned as to be movable into alignment with said pin for removal thereof through said opening.

31. The combination of a wheel having a main and a crank pin hub and a substantially imperforate web, and driving means for said wheel having an element removable in a direction substantially normal to and within the plane of said web, said web having an opening spaced in relation to said hubs and adapted to be aligned with said element for removal thereof through said web.

32. In a wheel, the combination of a wheel center having a counter-balance portion integrally formed therewith and provided with oppositely disposed walls, each of said walls having an opening for removal of core forming material from said portion and introduction of counter-balancing material, said counter-balance portion having an uninterrupted rim forming part, and a tire fitted to said center, said uninterrupted rim forming part enclosing said counter-balancing material within said portion and preventing passage thereof into the joint between said center and tire.

33. A cast wheel comprising a rim portion, a hub portion, spaced webs between said portions and each having an opening in alignment with an opening in the other, and reinforcing members spaced for the removal of core-forming material extending between said webs adjacent the marginal edge of said openings.

34. A cast wheel comprising a rim portion, a hub portion, spaced webs between said portions and having aligned openings for removal of core-forming material, and reinforcing members between said webs adjacent said openings, said members extending laterally away from said openings.

HARRY E. DOERR.